(12) United States Patent
Jeong et al.

(10) Patent No.: US 10,593,937 B2
(45) Date of Patent: Mar. 17, 2020

(54) ANODE AND LITHIUM SECONDARY BATTERY COMPRISING THE SAME

(71) Applicant: LG Chem, Ltd., Seoul (KR)

(72) Inventors: Kwang Ho Jeong, Daejeon (KR); Ye Cheol Rho, Daejeon (KR); Jung Woo Yoo, Daejeon (KR); Je Young Kim, Daejeon (KR)

(73) Assignee: LG Chem, Ltd. (KR)

( * ) Notice: Subject to any disclaimer, the term of this patent is extended or adjusted under 35 U.S.C. 154(b) by 54 days.

(21) Appl. No.: 15/641,607

(22) Filed: Jul. 5, 2017

(65) Prior Publication Data

US 2018/0006300 A1    Jan. 4, 2018

(30) Foreign Application Priority Data

Jul. 4, 2016 (KR) .................. 10-2016-0083957

(51) Int. Cl.

| | |
|---|---|
| H01M 4/00 | (2006.01) |
| H01M 4/36 | (2006.01) |
| H01M 4/587 | (2010.01) |
| C01B 32/21 | (2017.01) |
| H01M 4/62 | (2006.01) |
| H01M 2/10 | (2006.01) |
| H01M 4/133 | (2010.01) |
| H01M 4/583 | (2010.01) |
| H01M 4/66 | (2006.01) |
| H01M 10/0525 | (2010.01) |

(52) U.S. Cl.
CPC ............. *H01M 4/366* (2013.01); *C01B 32/21* (2017.08); *H01M 2/1077* (2013.01); *H01M 4/133* (2013.01); *H01M 4/583* (2013.01); *H01M 4/587* (2013.01); *H01M 4/622* (2013.01); *H01M 4/623* (2013.01); *H01M 4/661* (2013.01); *H01M 4/667* (2013.01); *H01M 10/0525* (2013.01); *H01M 2220/20* (2013.01)

(58) Field of Classification Search
CPC combination set(s) only.
See application file for complete search history.

(56) References Cited

U.S. PATENT DOCUMENTS

| | | | | |
|---|---|---|---|---|
| 2012/0183770 A1* | 7/2012 | Bosnyak | ............... | B82Y 30/00 |
| | | | | 428/367 |
| 2015/0079477 A1* | 3/2015 | Spahr | ..................... | C23C 16/26 |
| | | | | 429/231.8 |

(Continued)

FOREIGN PATENT DOCUMENTS

| | | | |
|---|---|---|---|
| JP | 2013089422 A | | 5/2013 |
| KR | 20140095980 A | | 8/2014 |

(Continued)

OTHER PUBLICATIONS

How to Convert Ppm to Mg/Kg, by Michael Judge; Updated Apr. 24, 2017 (Year: 2017).*

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

The present invention relates to a negative electrode including an active material layer which includes carbon-based particles having an oxygen content of 700 mg/kg to 1,700 mg/kg, and a secondary battery including the same.

15 Claims, 1 Drawing Sheet

(56) References Cited

U.S. PATENT DOCUMENTS

| | | | |
|---|---|---|---|
| 2015/0207148 A1* | 7/2015 | Kimura | H01M 4/622 |
| | | | 429/199 |
| 2016/0104584 A1* | 4/2016 | Jiang | H01G 11/24 |
| | | | 361/502 |
| 2017/0200950 A1* | 7/2017 | Gulas | H01M 4/587 |
| 2017/0309902 A1 | 10/2017 | Jo et al. | |

FOREIGN PATENT DOCUMENTS

| KR | 20140141861 A | 12/2014 |
|---|---|---|
| KR | 20150059135 A | 5/2015 |
| KR | 20160040103 A | 4/2016 |

\* cited by examiner

ANODE AND LITHIUM SECONDARY BATTERY COMPRISING THE SAME

CROSS-REFERENCE TO RELATED APPLICATIONS

This application claims the benefit of Korean Patent Application No. 10-2016-0083957, filed on Jul. 4, 2016, in the Korean Intellectual Property Office, the disclosure of which is incorporated herein in its entirety by reference.

TECHNICAL FIELD

The present invention relates to a negative electrode and a method of preparing the same, and, specifically, the negative electrode includes carbon-based particles having an oxygen content of 700 mg/kg to 1,700 mg/kg.

BACKGROUND ART

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, i.e., high capacity, have been subjected to considerable research and have been commercialized and widely used.

In general, a secondary battery is composed of a positive electrode, a negative electrode, an electrolyte, and a separator, in which charge and discharge may be possible, because lithium ions, which are discharged from a positive electrode active material by first charging, may act to transfer energy while moving between both electrodes, for example, the lithium ions are intercalated into a negative electrode active material, such as carbon particles, and deintercalated during discharging. The electrodes each include a current collector and an active material layer, and a binder is generally used to increase adhesion between the active material and the current collector and adhesion between active material particles.

Typically, in order to further increase the adhesion, techniques of adding a separate additive to an electrode slurry or increasing a ratio of the binder have been introduced. However, in a case in which the additive is added or an amount of the binder is increased, since an amount of the active material particles is reduced, capacity may be reduced.

Thus, there is a need to develop an electrode in which the adhesion between the active material and the current collector and the adhesion between the active material particles may be secured while maintaining high capacity of the battery.

DISCLOSURE OF THE INVENTION

Technical Problem

An aspect of the present invention provides a negative electrode which has high capacity due to high weight of an active material in the negative electrode and may secure adhesion between the active material and a current collector and adhesion between active material particles.

Technical Solution

According to an aspect of the present invention, there is provided a negative electrode including an active material layer which includes carbon-based particles having an oxygen content of 700 mg/kg to 1,700 mg/kg.

Advantageous Effects

In a negative electrode according to an embodiment of the present invention, adhesion between active material and current collector and adhesion between active material particles may be improved due to a high oxygen content of carbon-based particles. Also, since the carbon-based particle have a high oxygen content, the adhesion between the active material and the current collector and the adhesion between the active material particles may be secured even if the amount of a binder is reduced. Furthermore, since the amount of the binder may be reduced, an amount of the carbon-based particles may be increased, and thus, capacity of a battery prepared may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms of a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

A negative electrode according to an embodiment of the present invention may include an active material layer which includes carbon-based particles having an oxygen content of 700 mg/kg to 1,700 mg/kg.

Figure 1:
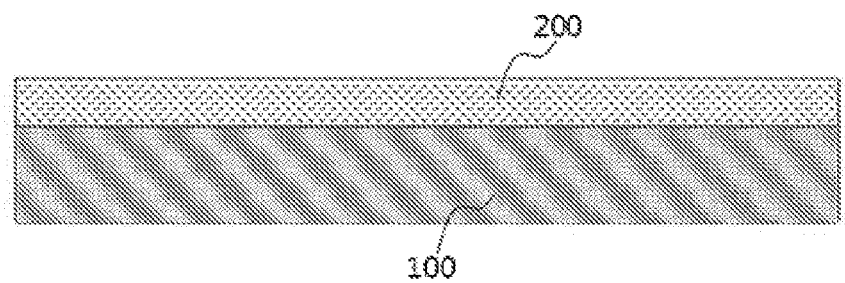
FIG. 1 is a schematic view illustrating a cross section of a negative electrode according to an embodiment of the present invention.

Referring to FIG. 1, the negative electrode may include a current collector 100 and an active material layer 200 disposed on the current collector. The active material layer may be disposed on one side or both sides of the current collector.

The current collector is not particularly limited as long as it has conductivity without causing adverse chemical changes in the battery, and, for example, copper, stainless steel, aluminum, nickel, titanium, fired carbon, or aluminum or stainless steel that is surface-treated with one of carbon, nickel, titanium, silver, or the like may be used. Specifically, a transition metal that adsorbs carbon well, such as copper and nickel, may be used as the current collector. The current collector having a thickness of 6 μm to 20 μm may be used, but the thickness of the current collector is not limited thereto.

The active material layer may include active material particles, and may further include a binder.

The active material particles may include carbon-based particles. The carbon-based particles may be at least one selected from the group consisting of artificial graphite, natural graphite, graphitized carbon fibers, and graphitized meso-carbon microbeads, and may specifically be natural graphite.

An oxygen content of the carbon-based particles may be in a range of 700 mg/kg to 1,700 mg/kg, and particularly 1,000 mg/kg to 1,600 mg/kg. The oxygen may be mainly included on a surface of the carbon-based particles. In a case in which the oxygen content of the carbon-based particles is less than 700 mg/kg, adhesion between the active material particles and the current collector and adhesion between the active material particles are excessively low, and thus, an amount of the binder may not be reduced. Accordingly, since an amount of the carbon-based particles may not be increased, it is difficult to achieve high capacity of the battery. In a case in which the oxygen content of the carbon-based particles is greater than 1,700 mg/kg, resistance of the battery may increase to an excessively high level. Also, if the carbon-based particles having an oxygen content greater than 1,700 mg/kg are used, since initial charge and discharge efficiency is significantly reduced, high capacity may not be achieved, and there is a limitation in that the possibility of gas generation during a continuous charge and discharge cycle is very high. The oxygen content may be measured by elemental analysis or gas spectroscopy, but the present invention is not limited thereto.

The carbon-based particles having an oxygen content of 700 mg/kg to 1,700 mg/kg may be prepared by oxidizing carbon-based particles having an oxygen content less than 700 mg/kg, the oxidation method may include dry oxidation and wet oxidation, and, in addition, electrochemical oxidation, oxidation by annealing, and oxidation by a plasma heat treatment may be used.

The dry oxidation may include an oxidation method, in which oxygen-containing gas, such as water vapor, carbon dioxide, oxygen, and ozone, is in contact with graphite at high temperature, and an oxidation method by surface grinding through ball milling. For example, the carbon-based particles having an oxygen content of 700 mg/kg to 1,700 mg/kg may be prepared by ball-milling the carbon-based particles having an oxygen content less than 700 mg/kg at a pressure of an oxygen-containing gas of 0.2 bar to 10 bar for 1 hour to 20 hours.

The wet oxidation may include an oxidation method in which an oxidant, such as hydrogen peroxide, sodium peroxide, sodium perchlorate, potassium permanganate, potassium manganate, potassium chromate, sodium chromate, potassium dichromate, sodium dichromate, formic acid, acetic acid, nitric acid, potassium nitrate, sodium nitrate, ammonium nitrate, sulfuric acid, potassium sulfate, and sodium sulfate, is added to a suspension in which the carbon-based particles having an oxygen content less than 700 mg/kg are dispersed in a solvent such as distilled water. For example, a suspension, in which the carbon-based particles having an oxygen content less than 700 mg/kg are included in an amount of 5 wt % to 30 wt % based on a total weight of a 2 M sulfuric acid solution, is prepared, and 10 wt % to 40 wt % of potassium permanganate based on a total weight of the suspension is added in a state in which the suspension is maintained at 20° C. or less. Thereafter, after stirring the solution in a temperature range of 60° C. to 100° C. for 0.5 hours to 3 hours, the solution was diluted with 300 wt % of distilled water based on a total weight of the solution, and the carbon-based particles having an oxygen content of 700 mg/kg to 1,700 mg/kg may be prepared by sufficiently washing a metal residue.

However, the preparation method of the carbon-based particles is not necessarily limited thereto.

The carbon-based particles may include a functional group including oxygen. Specifically, the carbon-based particles may include at least one selected from the group consisting of a hydroxyl group, a carboxyl group, and an epoxy group. The at least one selected from the group consisting of a hydroxyl group, a carboxyl group, and an epoxy group may be disposed on the surface of the carbon-based particles. The oxygen may be present in a state of being contained in the hydroxyl group, the carboxyl group, and the epoxy group.

The binder may include at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with lithium (Li), sodium (Na), or calcium (Ca), and may also include various copolymers thereof. Specifically, the binder may be at least one of carboxymethylcellulose and styrene-butadiene rubber, and, for example, the binder may include carboxymethylcellulose and styrene-butadiene rubber. The binder may be composed of carboxymethylcellulose and styrene-butadiene rubber. The carboxymethylcellulose may function as a thickener.

The active material layer may further include a conductive agent. Any conductive agent may be used without particular limitation so long as it has suitable conductivity without causing adverse chemical changes in the battery, and, for example, a conductive material, such as: graphite such as natural graphite and artificial graphite; carbon black such as acetylene black, Ketjen black, channel black, furnace black, lamp black, and thermal black; conductive fibers such as carbon fibers and metal fibers; conductive tubes such as carbon nanotubes; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used.

A weight ratio of the carbon-based particles to the binder may be in a range of 95:5 to 99:1, and particularly 96:4 to 98:2. In a case in which the active material layer includes the conductive agent, a weight ratio of the carbon-based particles to the conductive agent to the binder may be in a range of 94:1:5 to 99:0.01:1, and particularly 96:1:3 to 98:0.5:1.5. When typical carbon-based particles, i.e., the carbon-based particles having an oxygen content less than 700 mg/kg, are used, the adhesion between the active material particles and the current collector and the adhesion between the active material particles are not sufficient. Thus, in the related art, the adhesion has been supplemented by increasing an amount of a binder. In contrast, since the carbon-based particles according to an embodiment of the present invention exhibit high adhesion by themselves, the amount of the conventional binder may be reduced.

In a case in which the binder is composed of the carboxymethylcellulose and the styrene-butadiene rubber, an amount of the styrene-butadiene rubber may be in a range of 0.5 wt % to 1.5 wt % or less, and particularly 0.7 wt % to 1 wt % based on a total weight of the active material layer. The above weight range may be lower than a conventional amount range of the styrene-butadiene rubber. The adhesion between the active material particles and the current collector and the adhesion between the active material particles may be secured by the carbon-based particles having an oxygen content of 700 mg/kg to 1,700 mg/kg even if the amount of the styrene-butadiene rubber is low within the above range. Also, since the amount of the carbon-based particles may be increased as the amount of the styrene-butadiene rubber is reduced, capacity of the battery including the prepared negative electrode may be high.

In a case in which the binder includes the carboxymethylcellulose, a weight-average molecular weight (Mw) of the carboxymethylcellulose may be in a range of 500,000 g/mol to 4,500,000 g/mol, and particularly 700,000 g/mol to 3,500,000 g/mol. In a case in which the carboxymethylcellulose satisfies the above weight-average molecular weight range, the adhesion between the active material particles and the current collector and the adhesion between the active material particles may be further improved. In a case in which the weight-average molecular weight of the carboxymethylcellulose is greater than 4,500,000 g/mol, processability is reduced due to an increase in viscosity of a slurry, and, since an amount of distilled water added during slurry mixing is increased, electrode adhesion may be reduced due to a decrease in solid content of the slurry.

The negative electrode according to the embodiment of the present invention may be prepared by coating the current collector with a slurry, which is prepared by mixing an electrode material mixture including the carbon-based particles having an oxygen content of 700 mg/kg to 1,700 mg/kg and the binder with a solvent, and drying and rolling the coated current collector. The slurry may further include a conductive agent.

A secondary battery according to another embodiment of the present invention may include a negative electrode, a positive electrode, a separator disposed between the positive electrode and the negative electrode, and an electrolyte, and the negative electrode may be the electrode according to the embodiment of the present invention.

The separator separates the negative electrode and the positive electrode and provides a moving path of lithium ions, wherein the separator may be used without particular limitation so long as it is used as a separator in a typical secondary battery, and, in particular, a separator having high moisture-retention ability for an electrolyte solution as well as low resistance to the transfer of electrolyte ions may be used. Specifically, a porous polymer film, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, or a laminated structure of two or more layers thereof may be used. Also, a typical porous nonwoven fabric, for example, a nonwoven fabric formed of high melting point glass fibers or polyethylene terephthalate fibers may be used. Furthermore, in order to secure heat resistance and mechanical strength, a coated separator including a ceramic component or polymer material may be used and may be selectively used in a single layer or multilayer structure.

The electrolyte may include an organic-based electrolyte, an inorganic-based liquid electrolyte, a solid polymer electrolyte, a gel-type polymer electrolyte, a solid inorganic electrolyte, and a molten inorganic electrolyte which may be used in the preparation of a lithium secondary battery.

Specifically, the electrolyte used in the present embodiment may be an organic-based electrolyte. In a case in which an aqueous-based electrolyte is used, since the battery may be operated in a voltage range in which electrolysis of water does not occur, capacity of the battery is low. In contrast, since the battery may be operated at a higher voltage when the organic-based electrolyte is used, the battery capacity may be improved. Also, in general, when an active material having hydrophilicity is used with the organic-based electrolyte for reasons such as surface oxidation, the resistance may be increased, but, in a case in which the carbon-based particles having an oxygen content of 700 mg/kg to 1,700 mg/kg are used as in the present invention, since the amount of the binder, particularly the amount of the styrene-butadiene rubber, may be reduced, the resistance may be reduced. The organic-based electrolyte may include a non-aqueous organic solvent and a metal salt.

Examples of the non-aqueous organic solvent may be aprotic organic solvents, such as vinylene carbonate, N-methyl-2-pyrrolidone, propylene carbonate, ethyl methyl carbonate, ethylene carbonate, butylene carbonate, dimethyl carbonate, diethyl carbonate, γ-butyrolactone, 1,2-dimethoxy ethane, tetrahydroxy franc, 2-methyl tetrahydrofuran, dimethyl sulfoxide, 1,3-dioxolane, formamide, diemthylformamide, dioxolane, acetonitrile, nitromethane, methyl formate, methyl acetate, phosphate triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, and ethyl propionate, and two or more solvents thereof as well as any one thereof may be used together. In particular, ethylene carbonate and propylene carbonate, ring-type carbonates among carbonate-based organic solvents, well dissociate a lithium salt due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as ethyl methyl carbonate, dimethyl carbonate, or diethyl carbonate, in an appropriate ratio, the ring-type carbonate, for example, may be used.

Specifically, the non-aqueous organic solvent used in the embodiment of the present invention may be a mixture of ethylene carbonate and ethyl methyl carbonate, or a mixture of ethylene carbonate, ethyl methyl carbonate, and propylene carbonate.

The metal salt may include a lithium salt, and the lithium salt is a material that is readily soluble in the non-aqueous electrolyte solution, wherein, for example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt. Specifically, the metal salt used in the embodiment of the present invention may be $LiPF_6$.

At least one additive, for example, a haloalkylene carbonate-based compound such as difluoroethylene carbonate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, may be further included in the electrolyte in addition to the above-described electrolyte components for the purpose of improving life characteristics of the battery, preventing a decrease in battery capacity, and improving discharge capacity of the battery.

According to another embodiment of the present invention, a battery module including the secondary battery as a unit cell and a battery pack including the battery module are provided. Since the battery module and the battery pack include the secondary battery having high capacity, high rate capability, and high cycle characteristics, the battery module and the battery pack may be used as a power source of medium and large sized devices selected from the group consisting of an electric vehicle, a hybrid electric vehicle, a plug-in hybrid electric vehicle, and a power storage system.

Hereinafter, preferred examples will be provided for better understanding of the present invention. It will be apparent to those skilled in the art that these examples are only provided to illustrate the present invention and various modifications and alterations are possible within the scope and technical spirit of the present invention. Such modifications and alterations fall within the scope of claims included herein.

EXAMPLES AND COMPARATIVE EXAMPLES

Preparation Examples 1 and 2: Preparation of Active Material Particles

Preparation Example 1

Ball milling was performed on natural graphite having an oxygen content of 290 mg/kg at an oxygen gas pressure of bar for 1 hour to prepare natural graphite having an oxygen content of 1,470 mg/kg.

Preparation Example 2

Ball milling was performed on natural graphite having an oxygen content of 290 mg/kg at an oxygen gas pressure of 10 bar for 0.5 hours to prepare natural graphite having an oxygen content of 1,220 mg/kg.

Examples 1 to 4 and Comparative Examples 1 to 6: Preparation of Negative Electrode Example 1

The natural graphite prepared in Preparation Example 1, carbon black having an average particle diameter ($D_{50}$) of nm, carboxymethylcellulose having a weight-average molecular weight of 1,600,000 g/mol, and a styrene-butadiene rubber were added and mixed in a weight ratio of 95.3:1.0:1.2:2.5 with distilled water, as a solvent, to prepare a negative electrode slurry having a solid content of the mixture of 45%. A 20 μm thick copper (Cu) thin film, as a negative electrode collector, was coated with the negative electrode mixture slurry at a loading amount of 350 mg/25 cm$^2$ and dried. In this case, a temperature of circulating air was 100° C. Subsequently, after roll pressing and drying the coated negative electrode collector in a vacuum oven at 100° C. for 12 hours, the coated negative electrode collector was punched to a monocell size of 17.34 cm$^2$ to prepare a negative electrode.

Example 2

A negative electrode was prepared in the same manner as in Example 1 except that the natural graphite prepared in Preparation Example 1, carbon black, carboxymethylcellulose having a weight-average molecular weight of 3,500,000 g/mol, and a styrene-butadiene rubber were mixed in a weight ratio of 95.7:1.0:0.8:2.5.

Example 3

A negative electrode was prepared in the same manner as in Example 1 except that the natural graphite prepared in Preparation Example 2 was used instead of the natural graphite prepared in Preparation Example 1.

Example 4

A negative electrode was prepared in the same manner as in Example 2 except that the natural graphite prepared in Preparation Example 2 was used instead of the natural graphite prepared in Preparation Example 1.

Comparative Example 1

A negative electrode was prepared in the same manner as in Example 1 except that natural graphite having an oxygen content of 464 mg/kg was used instead of the natural graphite prepared in Preparation Example 1.

Comparative Example 2

A negative electrode was prepared in the same manner as in Example 2 except that natural graphite having an oxygen content of 464 mg/kg was used instead of the natural graphite prepared in Preparation Example 1.

Comparative Example 3

A negative electrode was prepared in the same manner as in Example 1 except that natural graphite having an oxygen content of 290 mg/kg was used instead of the natural graphite prepared in Preparation Example 1.

Comparative Example 4

A negative electrode was prepared in the same manner as in Example 2 except that natural graphite having an oxygen content of 290 mg/kg was used instead of the natural graphite prepared in Preparation Example 1.

Comparative Example 5

A negative electrode was prepared in the same manner as in Example 1 except that natural graphite having an oxygen content of 270 mg/kg was used instead of the natural graphite prepared in Preparation Example 1.

Comparative Example 6

A negative electrode was prepared in the same manner as in Example 2 except that natural graphite having an oxygen content of 270 mg/kg was used instead of the natural graphite prepared in Preparation Example 1.

The oxygen contents of Preparation Examples 1 and 2 and Comparative Examples 1 to 6 were measured by elemental analysis.

Test Example 1: Evaluation of Electrode Adhesion

The negative electrodes of Examples 1 to 4 and Comparative Examples 1 to 6 were punched to a size of 15 mm×150 mm and fixed to the center of slide glass having a size of 25 mm×75 mm with a tape, and 180 degree peel strength was then measured using a universal testing machine (UTM) while peeling off the negative electrode collector. In the evaluation, an average value was determined by measuring five or more peel strengths. The results thereof are presented in Table 1 below.

TABLE 1

| | Oxygen content of active material particles (mg/kg) | Weight ratio of active material particles:conductive agent:CMC:SBR | Weight-average molecular weight of CMC (g/mol) | Electrode adhesion (gf/15 mm) |
|---|---|---|---|---|
| Example 1 | 1470 | 95.3:1.0:1.2:2.5 | 1,600,000 | 145.3 |
| Example 2 | 1470 | 95.7:1.0:0.8:2.5 | 3,500,000 | 168.1 |
| Example 3 | 1220 | 95.3:1.0:1.2:2.5 | 1,600,000 | 143.9 |
| Example 4 | 1220 | 95.7:1.0:0.8:2.5 | 3,500,000 | 149.6 |
| Comparative Example 1 | 464 | 95.3:1.0:1.2:2.5 | 1,600,000 | 39.7 |
| Comparative Example 2 | 464 | 95.7:1.0:0.8:2.5 | 3,500,000 | 50.7 |
| Comparative Example 3 | 290 | 95.3:1.0:1.2:2.5 | 1,600,000 | 34.8 |
| Comparative Example 4 | 290 | 95.7:1.0:0.8:2.5 | 3,500,000 | 44.1 |
| Comparative Example 5 | 270 | 95.3:1.0:1.2:2.5 | 1,600,000 | 12.3 |
| Comparative Example 6 | 270 | 95.7:1.0:0.8:2.5 | 3,500,000 | 15.9 |

Referring to Table 1, it may be confirmed that examples, in which the natural graphite having a high oxygen content of 1,470 mg/mol or 1,220 mg/mol was used, had significantly higher electrode adhesion than comparative examples in which the natural graphite having an oxygen content less than 700 mg/kg was used. Also, in a case in which the high molecular weight CMC was used, it may be confirmed that the electrode adhesion may be further improved.

Example 5: Preparation of Negative Electrode

Example 5

A negative electrode was prepared in the same manner as in Example 1 except that the natural graphite prepared in Preparation Example 1, carbon black, carboxymethylcellulose having a weight-average molecular weight of 3,500,000 g/mol, and a styrene-butadiene rubber were mixed in a weight ratio of 97.2:1.0:0.8:1.0.

Example 6 and Comparative Example 7: Preparation of Battery

Batteries of Example 6 and Comparative Example 7 were respectively prepared by using the negative electrodes prepared in Example 5 and Comparative Example 2. Specifically, each of the negative electrodes was cut into a circle of area 1.4875 cm$^2$, and Li-metal was used as a positive electrode. A porous polyethylene separator was disposed between the positive electrode and the negative electrode, and a coin-half-cell including one sheet of each of the Li-metal and the negative electrode was prepared by injecting an electrolyte solution in which 1 M LiPF$_6$ was dissolved in a mixed solution in which a mixing volume ratio of ethyl methyl carbonate (EMC) to ethylene carbonate (EC) was 7:3.

Test Example 2: Evaluation of Electrode Adhesion

Electrode adhesion was evaluated for Example 5 in the same manner as in Test Example 1, and electrode adhesions of Example 5 and Comparative Example 2 are respectively presented in Table 2 below.

Test Example 3: Evaluation of Capacity of Electrode

Capacity of the electrode was evaluated for each of the batteries of Example 6 and Comparative Example 7. Before the evaluation, charge and discharge were performed once at a current (0.1 C-rate) corresponding to 1/10 of actual capacity to allow an SEI to be sufficiently formed.

Figure 2:
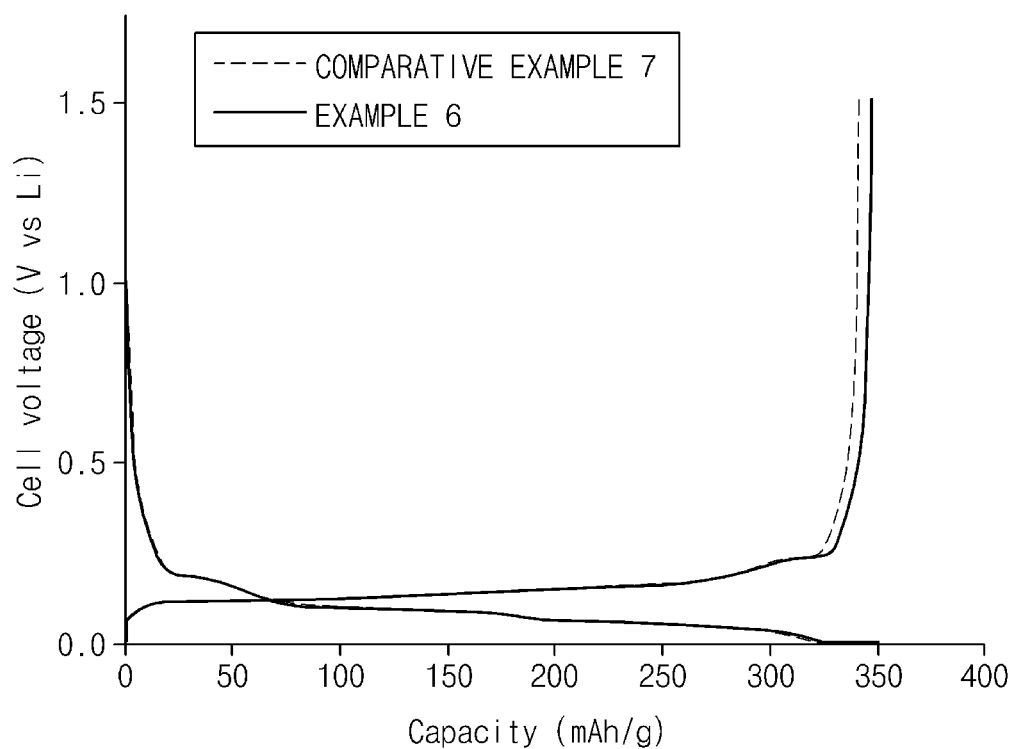
FIG. 2 is a graph illustrating discharge capacities of batteries according to Example of the present invention and Comparative Example.

Capacity of each battery was evaluated from discharge capacity which was measured by performing charge and discharge once at a current (0.1 C-rate) of 1/10 of a value corresponding to actual capacity of the battery at room temperature (25° C.). The results thereof are presented in Table 3 and FIG. 2, and, in this case, the discharge capacity was represented as capacity per unit electrode weight by being divided by the weight of the negative electrode.

TABLE 2

| | Oxygen content of natural graphite (mg/kg) | Weight ratio of active material:conductive agent:CMC:SBR | Weight-average molecular weight of CMC (g/mol) | Electrode adhesion (gf/15 mm) |
|---|---|---|---|---|
| Example 5 | 1470 | 97.2:1.0:0.8:1.0 | 3,500,000 | 49.5 |
| Comparative Example 2 | 464 | 95.7:1.0:0.8:2.5 | 3,500,000 | 50.7 |

TABLE 3

| | Negative electrode | Discharge capacity (mAh/g) |
|---|---|---|
| Example 6 | Example 5 | 346.85 |
| Comparative Example 7 | Comparative Example 2 | 341.82 |

Referring to Table 2, with respect to Example 5, the styrene-butadiene rubber was used in a low amount of 1.0 wt %, but the electrode adhesion was not significantly different from the electrode adhesion of Comparative Example 2 due to the carbon-based particles having a high oxygen content. That is, when the carbon-based particles having a high oxygen content were used, it may be confirmed that the electrode adhesion was secured even if the amount of the styrene-butadiene rubber was reduced. Also, referring to Table 3 and FIG. 2, discharge capacity of the battery of Example 6 using the negative electrode of Example 5 was higher than discharge capacity of the battery of Comparative Example 7 using the negative electrode of Comparative Example 2. That is, it may be confirmed that, since the amount of the carbon-based particles having a high oxygen content may be increased while reducing the amount of the styrene-butadiene rubber, high capacity of the battery may be achieved.

The invention claimed is:

1. A secondary battery comprising:
a negative electrode;
a positive electrode;
a separator disposed between the positive electrode and the negative electrode; and
an electrolyte, wherein a negative electrode comprising an active material layer which includes carbon-based particles having an oxygen content of 1,000 mg/kg to 1,600 mg/kg, wherein the carbon-based particles comprise natural graphite.

2. The secondary battery of claim 1, wherein the electrolyte is an organic-based electrolyte.

3. A battery module comprising a secondary battery as a unit cell, said secondary battery comprising a negative electrode comprising an active material layer which includes carbon-based particles having an oxygen content of 700 mg/kg to 1,700 mg/kg wherein the carbon-based particles comprise natural graphite;
a positive electrode;
a separator disposed between the positive electrode and the negative electrode; and
an electrolyte.

4. A battery pack comprising the battery module of claim 3 and used as a power source of a device.

5. The battery pack of claim 4, wherein the device comprises an electric vehicle, a hybrid electric vehicle, a plug-in hybrid electric vehicle, or a power storage device.

6. The second battery of claim 1, wherein the carbon-based particles consist essentially of said natural graphite.

7. The secondary battery of claim 1, wherein the carbon-based particles comprise at least one selected from the group consisting of a hydroxyl group, a carboxyl group, and an epoxy group.

8. The secondary battery of claim 7, wherein the at least one selected from the group consisting of a hydroxyl group, a carboxyl group, and an epoxy group is disposed on a surface of the carbon-based particles.

9. The secondary battery of claim 1, wherein the active material layer further comprises a binder.

10. The secondary battery of claim 9, wherein a weight ratio of the carbon-based particles to the binder is in a range of 95:5 to 99:1.

11. The secondary battery of claim 9, wherein the binder comprises at least one selected from the group consisting of a polyvinylidene fluoride-hexafluoropropylene copolymer (PVDF-co-HFP), polyvinylidene fluoride, polyacrylonitrile, polymethylmethacrylate, polyvinyl alcohol, carboxymethylcellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluorine rubber, polyacrylic acid, and polymers in which hydrogen thereof is substituted with lithium (Li), sodium (Na), or calcium (Ca).

12. The secondary battery of claim 11, wherein the binder comprises the carboxymethylcellulose and the styrene-butadiene rubber.

13. The secondary battery of claim 12, wherein a weight-average molecular weight of the carboxymethylcellulose is in a range of 500,000 g/mol to 4,500,000 g/mol.

14. The secondary battery of claim 12, wherein an amount of the styrene-butadiene rubber is in a range of 0.5 wt % to 1.5 wt % based on a total weight of the active material layer.

15. The secondary battery of claim 9, wherein the active material layer further comprises a conductive agent, wherein a weight ratio of the carbon-based particles to the conductive agent to the binder is in a range of 94:1:5 to 99:0.01:1.

* * * * *